(12) United States Patent
Hassan

(10) Patent No.: US 7,216,471 B1
(45) Date of Patent: May 15, 2007

(54) ATTACHABLE CARRIAGE FOR CONVERTING AN EDGE TRIMMER TO A LAWNMOWER

(76) Inventor: Rizwan Syed Hassan, 3414 Manchester Common, Fremont, CA (US) 94536

( * ) Notice: Subject to any disclaimer, the term of this patent is extended or adjusted under 35 U.S.C. 154(b) by 0 days.

(21) Appl. No.: 10/442,383

(22) Filed: May 21, 2003

Related U.S. Application Data

(63) Continuation-in-part of application No. 10/211,722, filed on Aug. 2, 2002, now abandoned.

(51) Int. Cl.
*A01D 34/00* (2006.01)
(52) U.S. Cl. ................................ 56/12.7; 56/320.1
(58) Field of Classification Search .......... 56/12.7, 56/16.7, 17.1, 17.2, 320.1
See application file for complete search history.

(56) References Cited

U.S. PATENT DOCUMENTS

| | | | | |
|---|---|---|---|---|
| 2,915,318 A | * | 12/1959 | Chesser | 280/43 |
| 2,938,323 A | * | 5/1960 | Shaver et al. | 56/16.9 |
| 4,083,168 A | * | 4/1978 | Oscarsson | 56/320.2 |
| 4,097,991 A | * | 7/1978 | Proulx | 30/276 |
| 4,237,610 A | * | 12/1980 | Bradus et al. | 30/276 |
| 4,389,836 A | * | 6/1983 | Lowry et al. | 56/12.7 |
| 4,633,658 A | * | 1/1987 | Nogawa | 56/255 |
| 4,756,147 A | * | 7/1988 | Savell | 56/16.7 |
| 4,823,542 A | * | 4/1989 | Klever et al. | 56/17.5 |
| 4,860,525 A | * | 8/1989 | Chee | 56/12.7 |
| 6,370,854 B1 | * | 4/2002 | Moore | 56/17.2 |

* cited by examiner

*Primary Examiner*—Thomas B. Will
*Assistant Examiner*—Alicia Torres

(57) ABSTRACT

Some embodiments of the invention provide a multipurpose gardening tool having an attachable circular carriage for converting an edge trimmer to a lawnmower for cutting and trimming grass and bushes. The circular carriage has an opening configured for receiving the edge trimmer. The multipurpose gardening tool also includes a coupler. The coupler allows a user to fixedly couple the edge trimmer to the carriage housing without use of any tools.

The multipurpose gardening tool further includes wheels for maneuvering the lawnmower. A height adjuster couples these wheels to the carriage. The coupling allows the wheels to be manually and independently controlled for lifting the carriage off the surface of the ground and adjusting the height of the carriage.

3 Claims, 9 Drawing Sheets

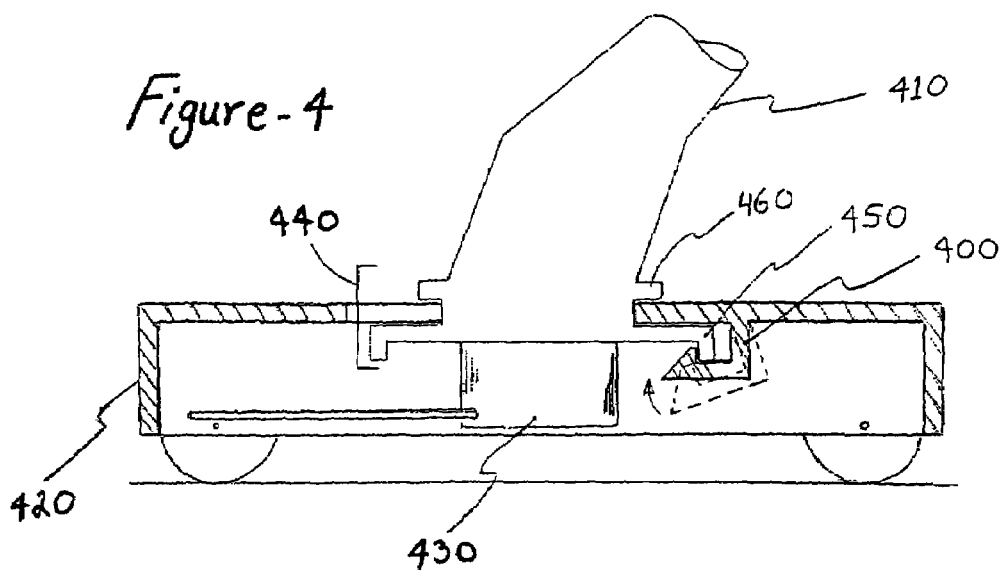

ATTACHABLE CARRIAGE FOR CONVERTING AN EDGE TRIMMER TO A LAWNMOWER

CLAIM OF BENEFIT TO PRIOR APPLICATION

This patent application is a continuation-in-part patent application and claims benefit of U.S. patent application Ser. No. 10/211,722, filed on Aug. 2, 2002 now abandoned by the same inventor.

FIELD OF INVENTION

The invention relates to grass cutting and trimming. The invention also relates to an attachable carriage for converting an edge trimmer to a lawnmower.

BACKGROUND OF INVENTION

Healthy lawns depicting a well maintained appearance require proper care. This includes cutting the grass and trimming shrubs and weeds that grow on the lawns. These lawns may be categorized into two types; commercial and household lawns. Commercial lawns are very large in size and require heavy industrial lawn maintenance equipment. Household lawns are smaller than commercial lawns and are maintained by manually operated lawnmowers to cut grass and manually operated trimmers to trim shrubs, weeds, and edges.

Some manually operated lawnmowers allow a user to attach a trimmer to the lawnmower. This attachment requires use of tools and allows the user to use the lawnmower for cutting grass and detach the trimmer from the lawnmower to trim. Since these manually operated lawnmowers are heavy and consume a large amount of space this attachment poses maneuvering and storage obstacles for homeowners with limited space. In addition use of tools for attachment requires additional time, energy, and complexity.

One type of manually operated lawnmower uses a combination of a rectangular shaped carriage and a circular blade attached to the bottom of the rectangular shaped carriage. This combination leaves ample space between the round blade fitted inside the rectangular carriage and the edge of the carriage. Since most home lawns have several sharp corners and edges with limited room to maneuver, the rectangular shaped body of the carriage comes in contact with the corner first and prevents the circular blade inside the rectangular carriage from coming in close proximity to the edges and corners making it impossible to cut the grass in these places.

Some existing lawnmowers have sets of front and back wheels that are attached to the carriage at an equidistant height level from ground. Since some lawns exist on angular, non-flat, and uneven terrains, the equidistant height of the wheels prevents the blade from coming in contact with the grass. For example, at the junction of a terrain that has a flat surface joined to a 45-degree incline surface, if front set of wheels are placed on the 45-degree incline surface and the back set of wheels are placed on the flat surface, then the sets of equidistant wheels lift the carriage such that the blade is high enough from the grass preventing it from either touching the grass altogether or touching the grass at the same level that the blade would have touched the grass if the carriage had been completely on the flat surface or the 45-degree inclined surface. This results in the lawn having portions of uncut or uneven grass as the user maneuvers the lawnmower over the uneven terrain. In some instances, some lawnmowers allow wheel height adjustment to raise or lower the lawnmower. However, this type of wheel height adjustment only allows all the wheels to be simultaneously raised thereby raising the lawnmower uniformly. This type of height adjustment does not solve the uneven terrain problem and prevents the lawnmower blade from touching the grass to obtain a uniformly cut lawn.

Therefore, there is a need for a carriage that allows easy attachment of a trimmer to trim and cut grass uniformly on all terrains and consume a small amount of storage space.

SUMMARY OF THE INVENTION

Some embodiments of the invention provide a multipurpose gardening tool having an attachable circular carriage for converting an edge trimmer to a lawnmower for cutting and trimming grass and bushes. The circular carriage has an opening configured for receiving the edge trimmer. The multipurpose gardening tool also includes a coupler. The coupler allows a user to fixedly couple the edge trimmer to the carriage housing without use of any tools.

The multipurpose gardening tool further includes wheels for maneuvering the lawnmower.

A height adjuster couples these wheels to the carriage. The coupling allows the wheels to be manually and independently controlled for lifting the carriage off the surface of the ground and adjusting the height of the carriage.

BRIEF DESCRIPTION OF THE DRAWINGS

The novel features of the invention are set forth in the appended claims. However, for purpose of explanation, several embodiments of the invention are set forth in the following figures.

FIG. 4 illustrates one embodiment of a coupling that uses a snap to couple the trimmer to the carriage.

FIG. 5 illustrates one embodiment of a coupling that uses a screw-fastener assembly to couple the trimmer to the carriage.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in a simple diagram form in order not to obscure the description of the invention with unnecessary detail.

Figure 1:
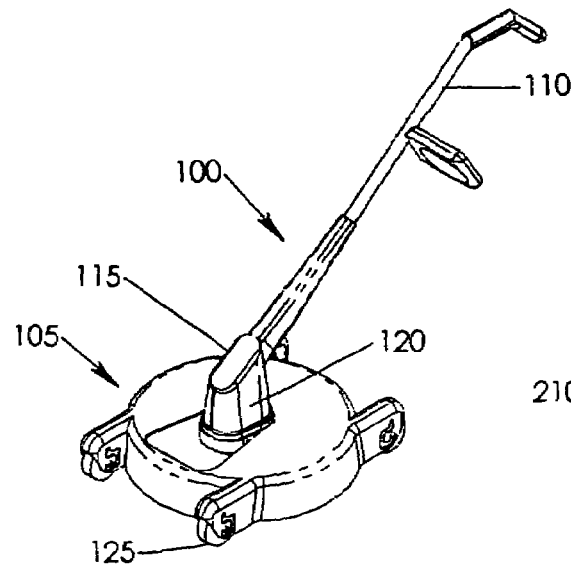
FIG. 1 illustrates a one embodiment of a carriage assembly coupled to a trimmer.

FIG. 1 illustrates one embodiment of the invention. This figure presents a trimmer 100 coupled to a carriage assembly 105. The trimmer 100 may be an off the shelf conventional trimmer that includes a handle 110 coupled to a trimmer head assembly 115. The trimmer head assembly 115 includes a motor placed inside a trimmer housing 120, a flange formed on the lower portion of the trimmer housing 120, and a trimmer rotary head located outside the trimmer housing 120 and coupled to the motor inside the trimmer housing 120. The rotary head includes features for coupling a wire or a blade. The motor spins the trimmer rotary head and thereby the wire or blade that is coupled to the motor and rotated at a speed selected by the user for trimming. Alternatively, other types of trimmers that use electric or gas motor are also contemplated.

Figure 2:
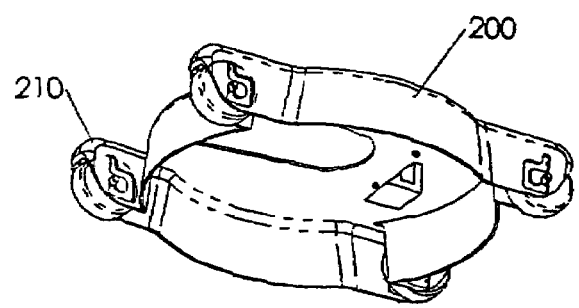
FIG. 2 illustrates one embodiment of a carriage housing used by the invention.

The carriage assembly 105 includes a carriage housing, several wheels 125 coupled to the carriage housing, and a coupler. The carriage housing 200 as shown in FIG. 2 is a rigid shell made from a thin plastic or metal. The carriage housing 200 is circular in shape and includes several protruding shapes such as rectangles 210. Each protrusion 210 blends with the circular carriage 200 and is located on the outer portion of the shell. The protrusion includes features for coupling a wheel as will be described later in more detail.

The coupler forms the coupling between the trimmer and the carriage assembly. Once coupled, the carriage assembly and the trimmer form a lawnmower. The lawnmower can be maneuvered by a user pushing the trimmer handle and allowing the wheels of the carriage assembly to roll across a lawn.

Figure 3:
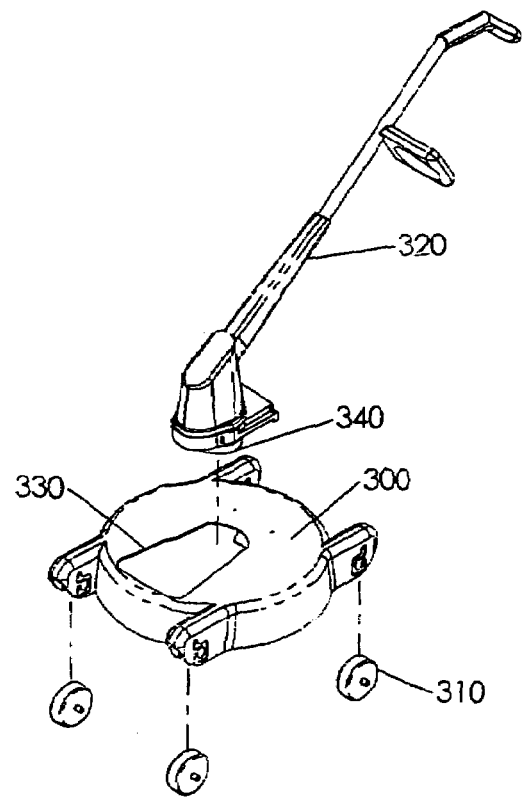
FIG. 3 illustrates an exploded view of the carriage assembly and edge trimmer used by the invention.

FIG. 3 shows one embodiment of the carriage assembly and the trimmer. This figure presents an exploded view of a carriage 300, several wheels 310, and a trimmer 320. In this embodiment, the rigid shell of the carriage housing 300 includes a small opening 330 on one side and a large opening on the opposite side. The smaller opening 330 allows the trimmer rotary head 340 to pass therethrough and be exposed from larger opening on the opposite side. This allows the wire or blade coupled to the trimmer rotary head 340 direct access to the grass through the larger opening in the carriage housing 310.

Various types of couplers can be used for coupling the trimmer to the carriage assembly. These couplers allow easy coupling without a need for any tools. This type of coupling prevents the user from spending any extra time, cost, effort or energy that is typically involved with tool usage. These couplers also allow a user to easily detach the trimmer from the carriage without using any tools. Thus a user desiring to trim edges, weeds, shrubs can simply detach the trimmer from the carriage housing by a simple detach operation using the coupler and use the trimmer for trimming. Similarly, the trimmer can be attached to the carriage assembly for mowing the lawn by a simple operational step performed by the user on the coupler.

Figure 6:
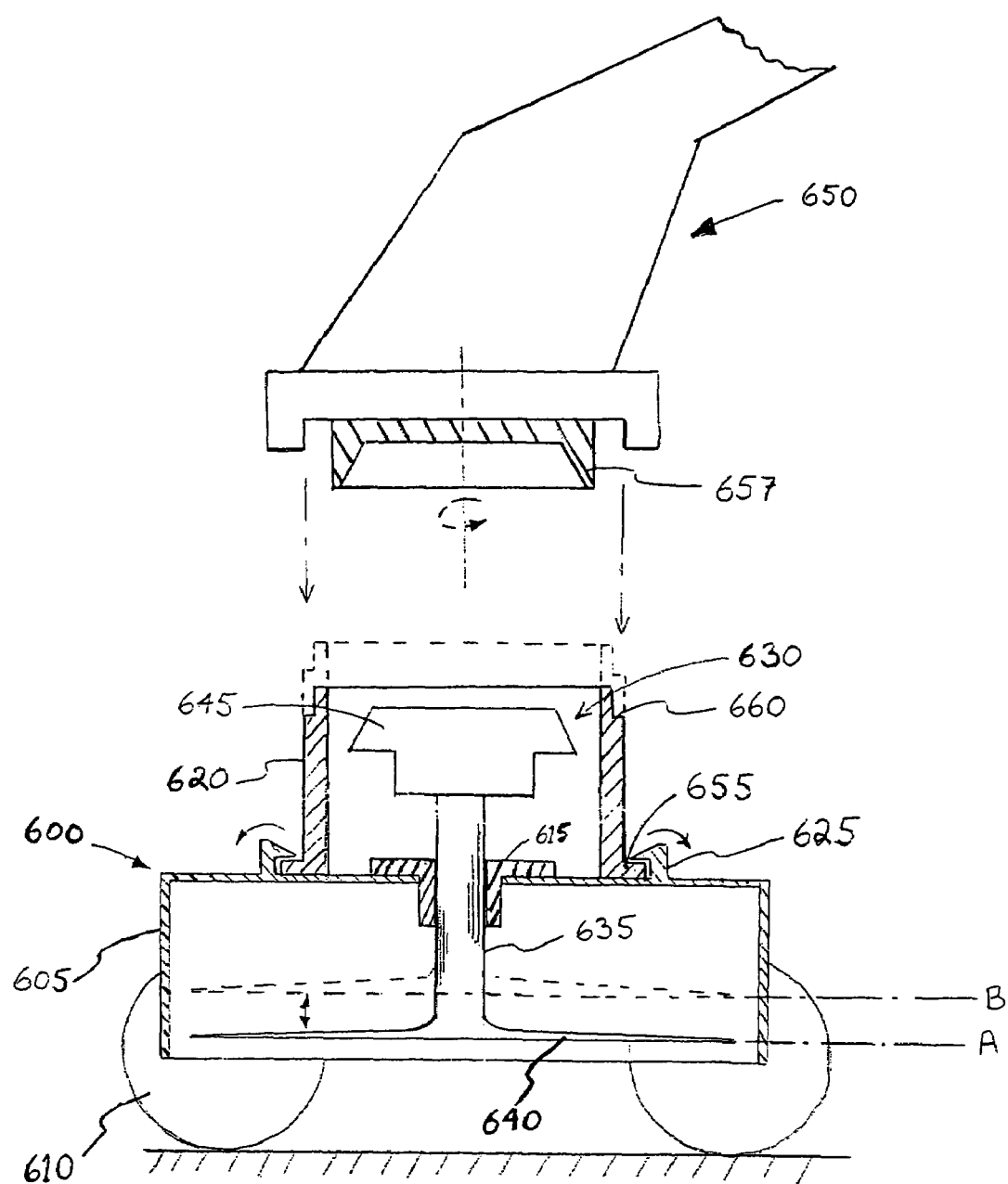
FIG. 6 illustrates one embodiment of a coupling that uses a standoff to couple the trimmer to the carriage.

FIGS. 4–6 show these coupling embodiments. FIG. 4 depicts a coupler that uses a snap feature 400 to couple the trimmer 410 to the carriage 420. This method of coupling requires a user to align the trimmer rotary head 430 with the small opening in the carriage 420. Once aligned, the trimmer rotary head 430 is inserted through the small opening allowing a portion of the trimmer flange 440 to push the snap feature aside to clear its way for a complete insertion of the rotary head 430.

As mentioned earlier, the flange 440 is formed within the trimmer's housing. The flange includes a lower rim 450 and an upper rim 460 and may be one of two types. The first type includes a lower rim 450 that is wider in diameter than the upper rim 460. In this case, after inserting the rotary head 430 through the small opening, the user aligns the wider lower rim 450 toggling the trimmer back and forth until the wider upper rim 460 is captured by the snap feature 400 in the carriage housing.

The second type of flange 440 includes a lower rim that is narrower in diameter than the upper rim. In this case, once the user aligns and inserts the rotary head 430 into the small opening, the lower rims that is wider in diameter than the rotary head 430 pushes the snap feature 400 aside. Once the lower rim of the flange 440 clears the snap feature 400, the snap 400 retracts to its original position and captures the flange by landing in the area between the narrower lower rim and the wider upper rim thereby fastening the trimmer 410 to the carriage assembly 420. Furthermore, the wider upper rim which has a surface area that is wider than the small opening comes in contact with the surface of the carriage housing and prevents the rotary head from further insertion into the small opening.

FIG. 5 depicts a coupling embodiment similar to a screw-faster assembly. In this embodiment, the carriage 500 and the trimmer 520 both include mating threads 530 and 540 for fastening the trimmer 520 to the carriage 500. In practice, a user can simply align the trimmer rotary head 550 with the smaller opening in the carriage 500 and insert the trimmer rotary head 550 into the small opening by turning the trimmer 520 in a clockwise direction for fastening. To unfasten or detach the trimmer 520 from the carriage 500, the trimmer 520 is rotated in an anti-clockwise direction. Alternatively, the mating may also be configured to rotate anti-clockwise for fastening and clockwise for unfastening.

The trimmer 520 maybe rotated along the threads 540 in the carriage 500 until the trimmer flange 560 comes to rest on the surface 570 of the carriage shell thereby fastening to the carriage. At this point, the trimmer 520 is coupled to the carriage assembly and a wire or blade 580 attached to the trimmer rotary head 550 is used for cutting the lawn.

FIG. 6 depicts an axle assembly used for coupling the trimmer to the carriage assembly. In this embodiment, the carriage assembly 600 includes a carriage 605, several wheels 610 coupled to the carriage 605, a sleeve 615, a standoff 620, and a standoff capturing snap 625. The axle assembly 630 includes an axle 635, a blade 640 coupled to one end of the axle 635, and an axle head 645 coupled to the other end of the axle 635. The axle 635 is snuggly fitted within the sleeve 615 of the carriage assembly 600 allowing vertical and rotational motion of the axle assembly 630.

Standoffs 620 with various heights are used to provide a sitting platform for the trimmer 650. Either a single standoff or multiple standoffs stacked one on top of each other can be used. Each standoff 620 includes a capturing feature 655 on one side and a groove 660 on the other side. A standoff snap capturing snap 625 located on the carriage captures the capturing feature 655 on the standoff to securely couple the standoff 620 to the carriage. The grooves 660 on the other side serve as a sitting platform for the trimmer housing thereby locking independent horizontal movement of the trimmer 650. Once the trimmer 650 is locked, a horizontal force exerted by the user on the trimmer's handle moves trimmer and carriage assembly together as one unit in the direction of the force allowing the user to maneuver the lawnmower across the lawn for cutting grass.

The axle head 645 is coupled to the trimmer rotary head 657 and receives power through the motor coupled to the trimmer rotary head 657 for spinning. Once the trimmer motor is powered "ON", the trimmer rotary head 657 coupled to the motor starts rotating. Since the axle head 645 is coupled to the rotary head 657, rotation of the rotary head 657 also causes the entire axle assemble 660 to rotate. This rotation allows the rotating blade 640 at the end of the axle 635 to rotate and cut the grass as the entire carriage assembly is being maneuvered across a lawn. The embodiments of FIGS. 5 and 6 also allow a user to adjust the distance between the blade and the grass. The blade is lowered to position A and made closer to the ground to allow for a deeper cut or raised a desired distance to position B from the ground allowing a surface cut.

In the embodiment of FIG. 5, as discussed earlier, the trimmer rotary head is coupled to the carriage assembly by mating the threads on the trimmer with threads on the carriage and rotating the trimmer in a clockwise direction for fixating it to the carriage assembly. In this embodiment, the trimmer the flange acts as a stop feature preventing the trimmer from being inserted further into the carriage opening. A 100% rotation of the trimmer allows the flange to come in contact with the surface of the carriage shell. Since a blade may be coupled to the trimmer rotary head, with each rotation in the direction of fastening the trimmer to the carriage assembly, the trimmer rotary head and the blade coupled to the trimmer rotary head is also lowered thus allowing for a deeper cut. If the user desires to perform a surface cut or a cut of a determinant height then a standoff with a desired height may be placed between the flange and the surface of the carriage shell. The standoff allows the flange to come to a stop before touching the surface of the carriage shell and raises the height of the blade coupled to the trimmer rotary head for regulating the height of the cut grass. Although the user may determine the height of the standoff, at least a 30% rotational engagement between the trimmer threads and the carriage threads is preferred for locking the trimmer to the carriage.

In the embodiment of FIG. 6, as discussed earlier, the trimmer rotary head sits on the grooves of the standoff and is coupled to the axle head of the axle assembly. In this embodiment, the height of the standoff can be varied to lower or raise the blade height from the grass. For example, a standoff that has a smaller height provides a sitting platform for the trimmer that is closer to the carriage and lowers the blade closer to the ground to allow for a deeper grass cut. Alternatively, a taller standoff raises the sitting table for the trimmer thereby raising the axle assembly and the blade coupled to the trimmer to allow for a surface cut.

Figure 7A:
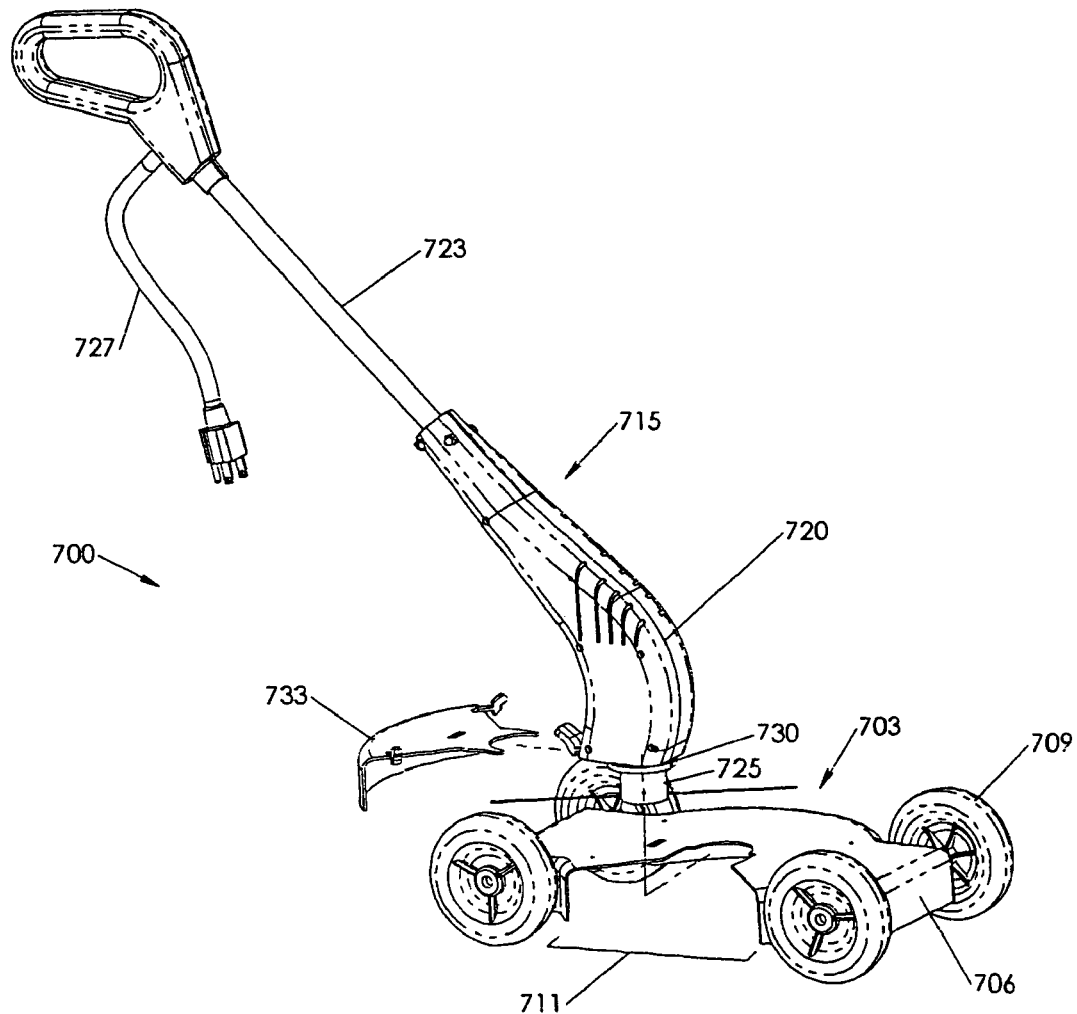
FIG. 7A illustrates an exploded view of a carriage assembly and a trimmer having a guard according to one embodiment.

FIGS. 7A–7F illustrate one embodiment of the invention. In progression, these figures present the coupling of a trimmer to a carriage assembly to form a lawnmower. FIG. 7A depicts an exploded view 700 of this lawnmower. The carriage assembly 703 includes a carriage 706 and several wheels 709. The carriage 706 is a rigid shell that is circular in shape and includes several protruding shapes such as rectangles. Each protrusion blends with the circular carriage and includes features for coupling a wheel 709. The carriage 706 also includes a cut out 711 for receiving the trimmer 715 for coupling.

The trimmer 715 includes a housing 720 coupled to a handle 723. The handle 723 provides a gripping area for a user for maneuvering the trimmer. A motor is housed inside the housing 720 and is coupled to a rotary head 725. The motor may be battery or electrically powered. A power cord 727 coupled to the trimmer 715 carries power to the motor for its operation. Once powered, the motor rotates the rotary head 725 that is located outside the housing 720 at a user desired speed. The trimmer 715 also includes a flange 730 and a guard 733. The guard 733 is detachably coupled to the housing 720 and provides a user safety against wire or blade contact while the trimmer is in operation. The guard 733 has features that allow it to be removed from the housing if desired by the user.

Figure 7B:
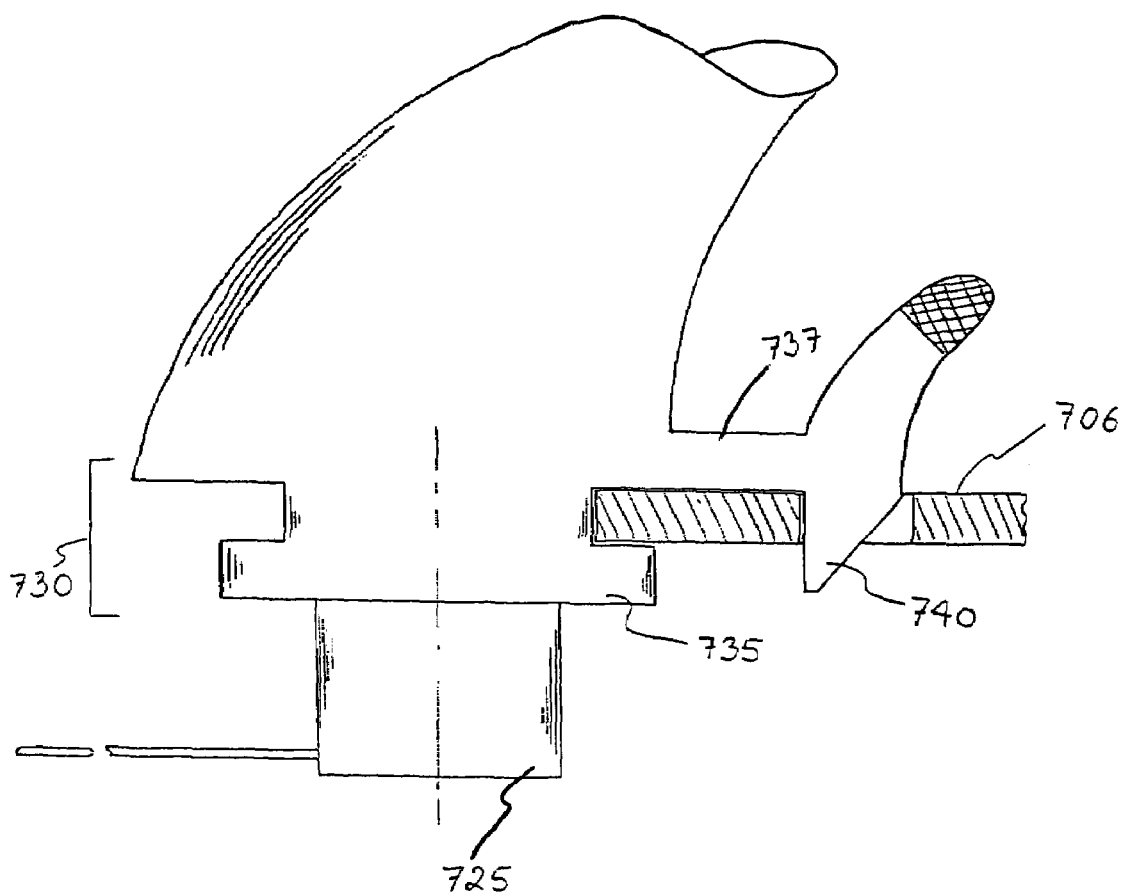
FIG. 7B illustrates a one embodiment of a detailed cross section of the trimmer fully inserted and coupled to the carriage housing.

The flange is formed within the trimmer's housing and may be circular or of any other shape. As shown in FIG. 7B, a flange 730 having a circular configuration includes a lower rim 735 that is narrower in diameter than the upper rim 737 of the flange. The area between the lower and upper rim provides a landing area. This landing area is used for coupling the trimmer to the carriage. The upper rim 737 has a surface area that is wider than the small opening comes in contact with the surface of the carriage housing 706 and prevents the rotary head 725 from further insertion into the small opening.

Figure 7C:
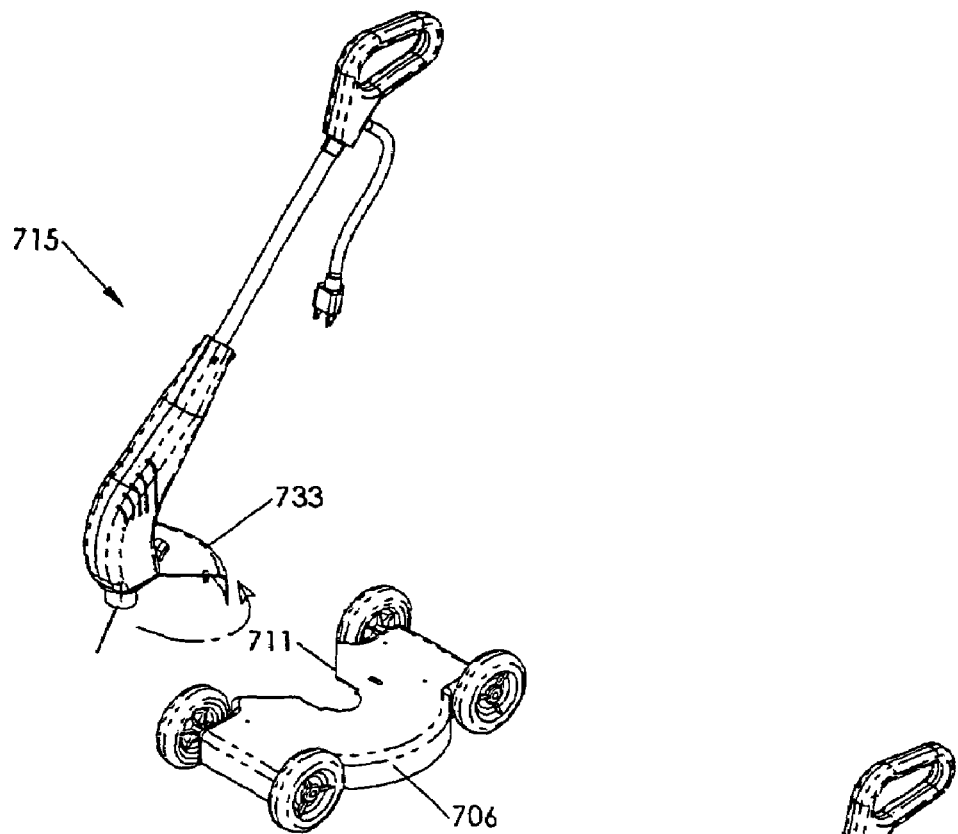
FIG. 7C illustrates rotation of the trimmer's guard for clearing a path for trimmer insertion into an opening in the carriage according to one embodiment.
Figure 7D:
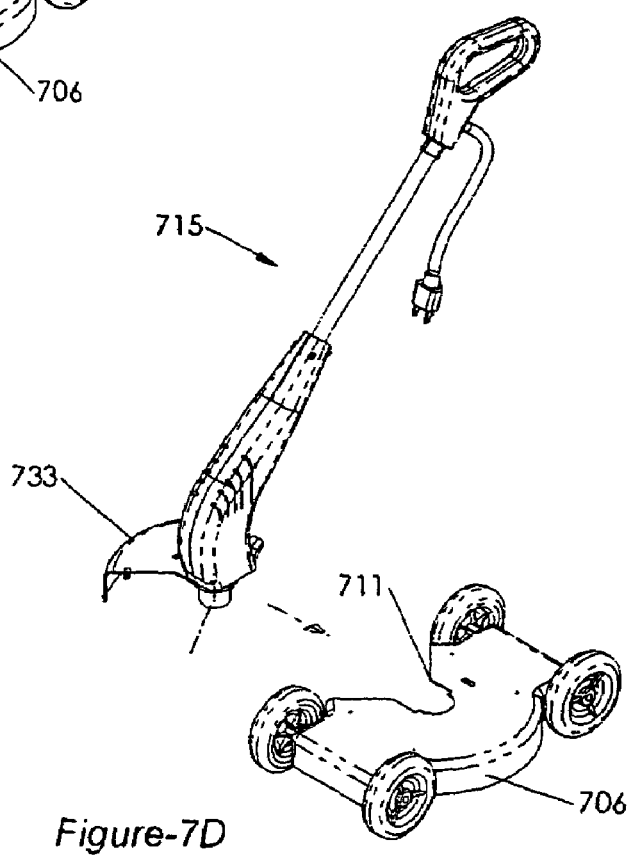
FIG. 7D illustrates insertion of the trimmer into the opening in the carriage after the trimmer guard has been fully moved out of the insertion path according to one embodiment.
Figure 7E:
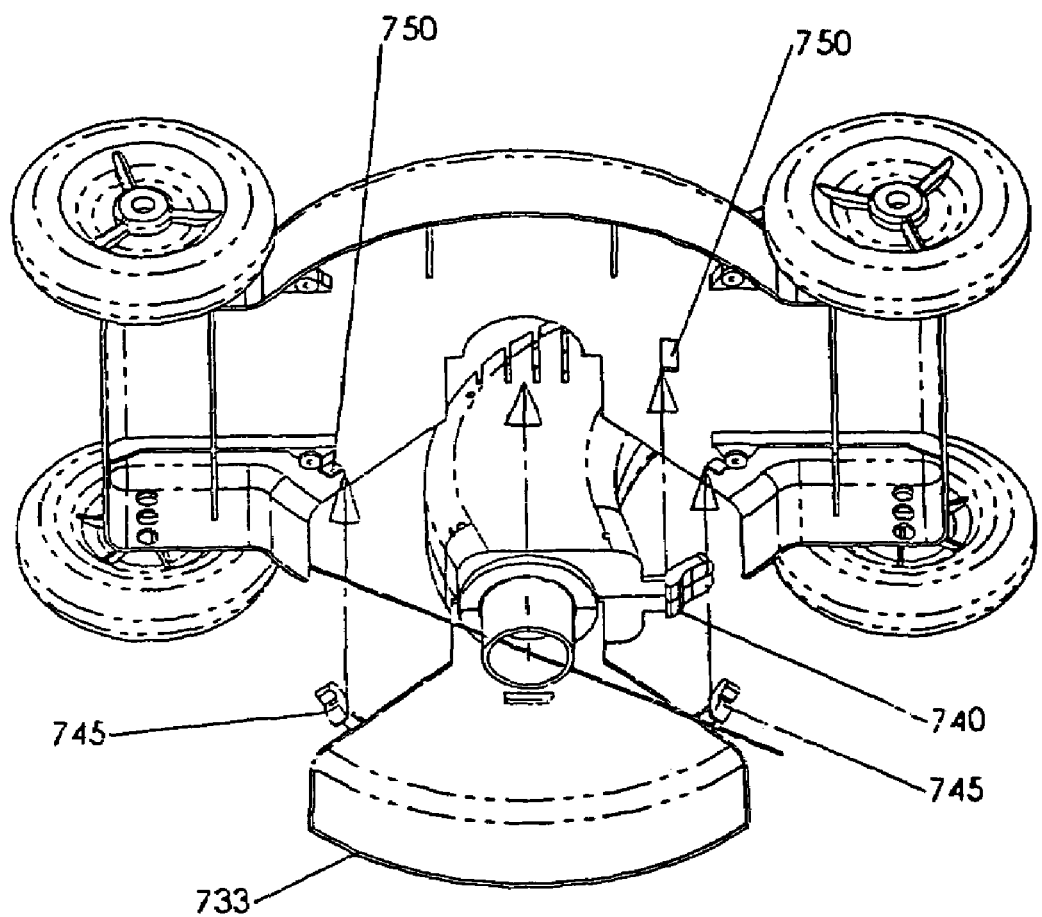
FIG. 7E illustrates insertion of the trimmer housing snaps and guard snaps into the holes of the carriage assembly for coupling the trimmer and guard to the carriage assembly according to one embodiment.
Figure 7F:
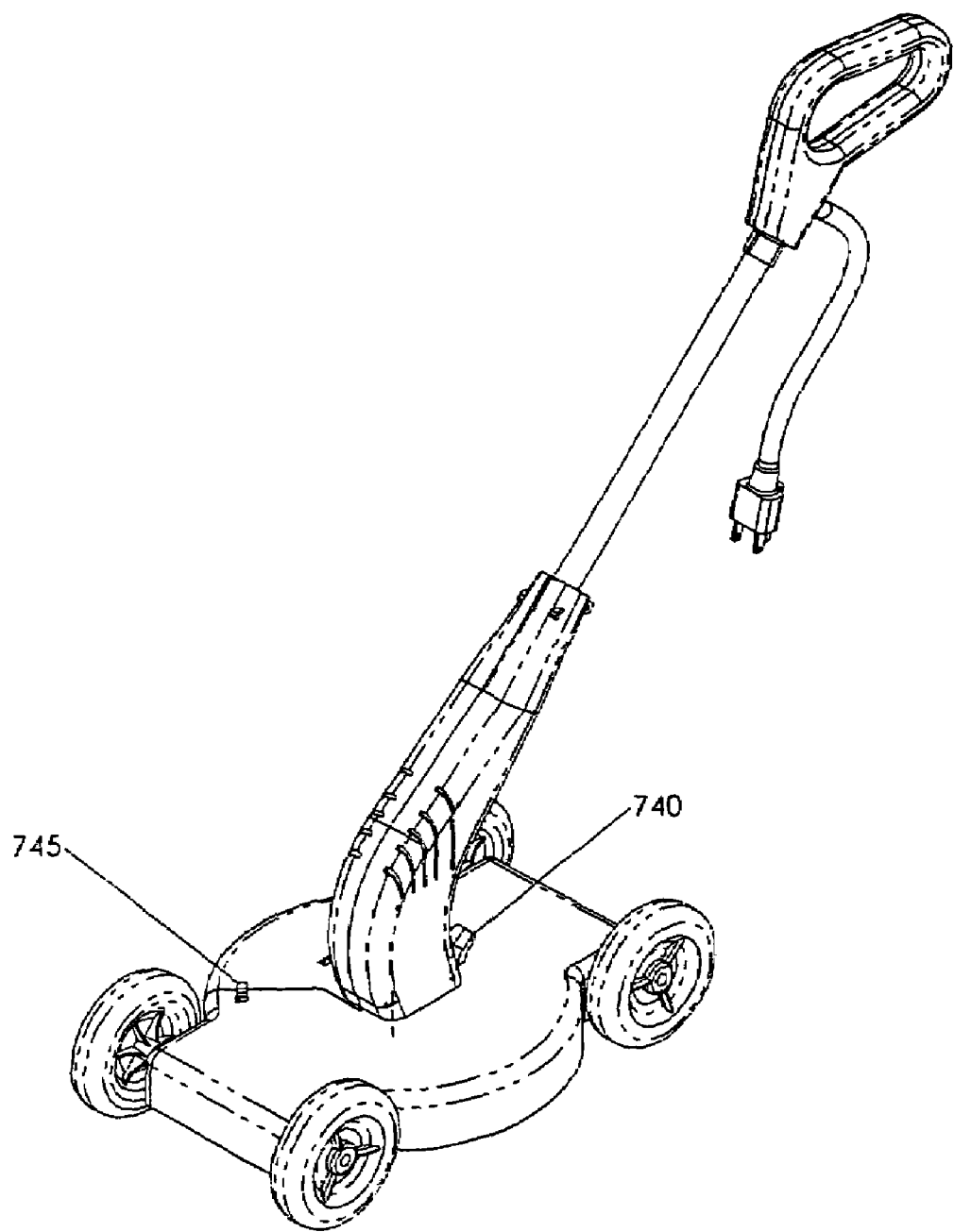
FIG. 7F illustrate one embodiment of a trimmer and guard coupled to the carriage assembly.

The coupling between the trimmer 715 and the carriage assembly 703 is further illustrated in FIGS. 7C and 7D. The cut out portion 711 of the carriage 706 allows the insertion of the trimmer 715 and the trimmer guard 733 in a horizontal direction for coupling. First, the trimmer guard 733 is rotated counter clockwise as shown in FIG. 7C. The rotation allows the trimmer 715 to be inserted in the cut out portion 711 removing the trimmer guard 733 out of the path of insertion as shown in FIG. 7D. Once the trimmer has been fully inserted, a trimmer housing snap 740 that is coupled to the trimmer housing 720 and trimmer guard snaps 745 coupled to the guard 733 capture the holes 750 in the carriage by retracting during the insertion and snapping into the carriage holes 750 once aligned with the carriage holes 750 at the position of full insertion as shown in FIG. 7E. As shown in FIG. 7F, the snaps couple the trimmer 715 and the carriage assembly 706 such that they can be operated as one unit. Referring back to FIG. 7B, the figure illustrates a detail cross section view of the coupling between the trimmer 715 and the carriage assembly 703. As shown here, the lower rim 735 of the flange 730 is inserted through the small opening in the carriage housing 706. The insertion places the thin shell of the carriage housing between the lower rim 735 and the upper rim 737. In addition the insertion allows the housing snap 740 coupled to the trimmer housing to fully inserted into the carriage holes 750 and lock the carriage to the trimmer. In this fully coupled position, the upper rim 737 prevents the trimmer 715 from any downward movement, the housing snap 740 prevents and horizontal movement between the trimmer 715 and the carriage assembly 703, and the carriage housing 706 trapped between the lower and upper rims obstructs the lower rim 735 from any upward movement thereby completely locking the trimmer 715 to the carriage assembly 703 in all directions. The coupled trimmer along with its guard encapsulates the wire or the blade inside the trimmer such that any debris or cut grass does not fly around. A user may also couple a cut grass collection bag and couple it to the trimmer for grass being collected as it is being cut.

Figure 8:
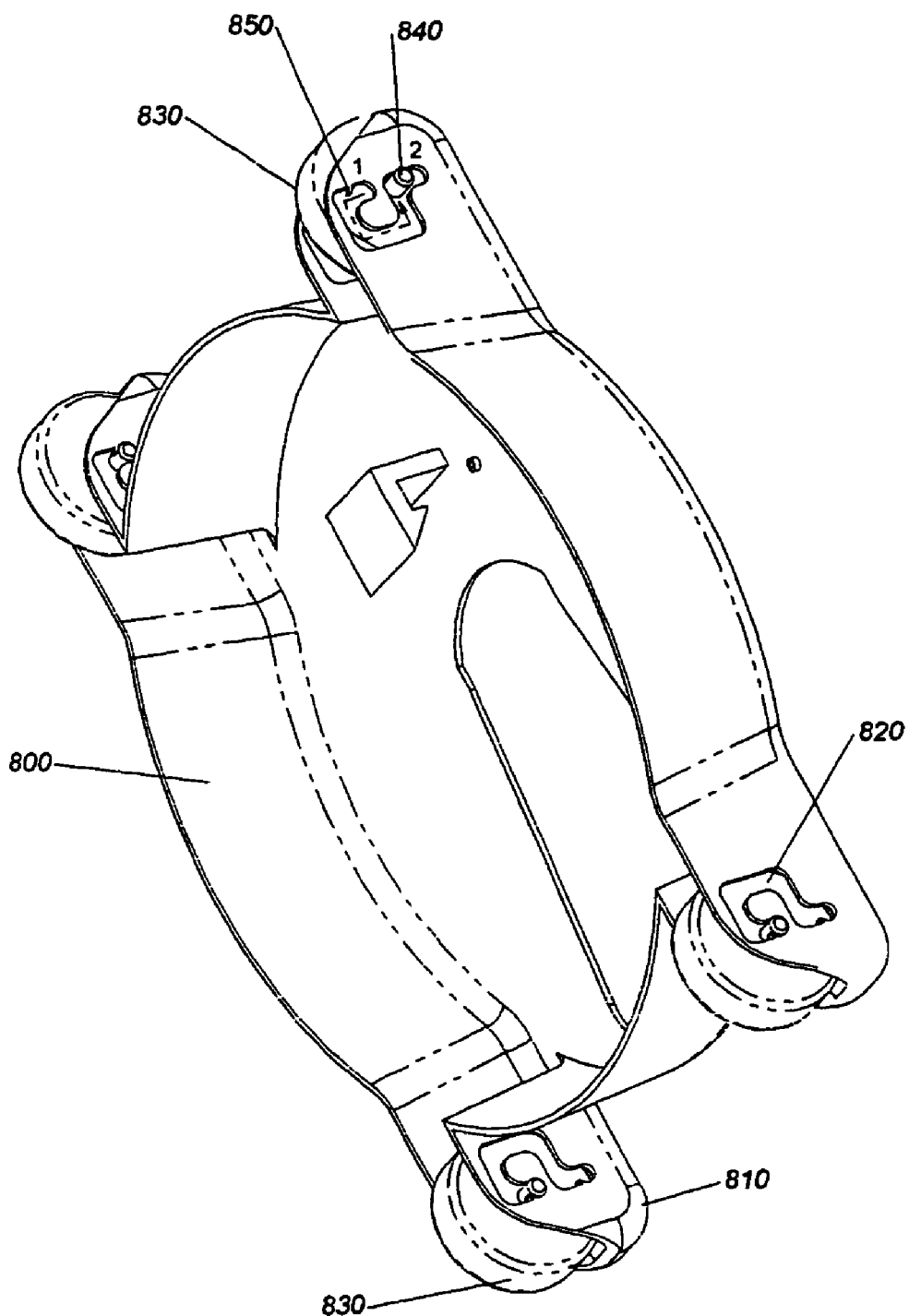
FIG. 8 illustrate a carriage having protruding rectangles with each rectangle having a grooved path to guide a wheel for height adjustment.

FIG. 8 illustrates one embodiment of the invention. This figure presents a carriage 800 having several protruding rectangles 810. Each protruding rectangle 810 includes a groove 820. The groove 820 provides a guided path for a wheel 830 and includes several twists and turns. Each wheel 830 includes a wheel shaft 840 that passes thought the center of the wheel 830. The wheel shaft 840 is captured within the groove 820 such that each wheel 830 can be maneuvered independently within the guided path of the groove from one position to another.

The groove 820 also includes a spring detent 850 for locking wheel position. Once the wheel shaft 840 it inserted in a position such as position 1, the wheel shaft 840 is constrained by the detent 850 and restricted from sliding within the guided path. In addition to the detent 850, the downward weight force of the carriage forces the wheel shaft 840 upwards towards the end of the groove 820 in position 1 preventing it from sliding. In order to move the wheel 830 from position 1 to position 2, first a user applies a force on the wheel to move the wheel out of the detent constraint. The move forces the detent aside and allows the wheel shaft 840 to be guided along the groove path. A user can then maneuver the wheel shaft 840 along the groove guided path to a second position where the wheel shaft can be locked by the detent 850. This movement from one vertical position to another allows the user to adjust the height of the carriage 800 and the blade coupled to the carriage 800. The blade height adjustment determines the amount of contact a blade will have with the grass and determines the height of cut for the grass.

In another embodiment, the carriage 800 includes several holes placed at various horizontal and vertical locations along the carriage 800. A wheel can be coupled to the carriage by inserting the wheel shaft through any of these holes. A user desiring to adjust the height of the carriage can simply detach the wheel from the carriage 800 and insert the wheel shaft 840 in another hole located at a different vertical location.

In addition, the individual movement of each wheel 830 allows the carriage 800 to be balanced even across uneven terrains. By placing one wheel 830 at position 1 and the other at position 2 a user can change the angle of the blade and the carriage and provide a parallel surface between the blade and the grass for a uniformly cut grass on an uneven terrain. Various combinations of angles may also be achieved by adjusting each wheel independently either to keep the blade parallel or at a desired angle for cutting the grass.

This wheel assisted lift prevents the blade in the carriage from coming in contact with the ground surface either during operation of the lawnmower or when the lawnmower is in a standing position. Blade contact with the ground surface during operation causes the blade to dig into the ground surface and ruin the lawn by extracting the roots of the grass. Also, if blade contact prevails over time when lawnmower is in a non-operational standing position, this contact can cause either rusting of the blade due to water deposits on ground or blade dullness due to ground contact. In addition, a wheel assisted lift of the carriage prevents a user from exerting energy to lift and push the carriage or accidentally bringing the blade in contact with the ground surface during operation. Also, wheel assisted lift ensures that an even amount of grass is cut as the lawnmower is pushed across the grass which in the case of a user assisted lift would require exact precision in maintaining the exact height from the ground to obtain an even cut.

I claim:

1. A multipurpose gardening tool powered by an electric motor for cutting and trimming lawns comprising:

a circular carriage having a small opening in its top, a large opening on its bottom, a carriage hole in its top, and a plurality of individually height adjustable wheels coupled to the carriage for adjusting the height and angle of the carriage, a trimmer having a rotatable guard and a housing that includes a flange, wherein said rotatable guard can be rotated relative to the trimmer, wherein said flange fits in the small opening of the carriage for manually coupling the trimmer to the carriage without use of any tools, and said rotatable guard aids in coupling the trimmer to the carriage such that the small opening is enclosed, wherein the flange includes a lower rim, an upper rim, and a landing area between the lower rim and the upper rim, wherein the lower rim has a smaller surface area than the upper rim; and a snap coupled to the trimmer housing, said flange being inserted into the carriage hole for coupling the trimmer to the carriage housing.

2. The multipurpose gardening tool of claim 1, wherein the carriage housing is a rigid thin shell.

3. The multipurpose gardening tool of claim 1, wherein the trimmer includes a rotary head.

* * * * *